US006684806B1

United States Patent
Duncan

(10) Patent No.: US 6,684,806 B1
(45) Date of Patent: Feb. 3, 2004

(54) HULLS FOR PLANING AND SEMI-PLANING CRAFT

(75) Inventor: Ian James Duncan, Southampton (GB)

(73) Assignee: Futuretech Technologies, Southampton (*) Notice: Subject to any disclaimer, the term of this patent is extended or adjusted under 35 U.S.C. 154(b) by 0 days.

(21) Appl. No.: 09/936,088

(22) PCT Filed: Mar. 9, 2000

(86) PCT No.: PCT/GB00/00864

§ 371 (c)(1),
(2), (4) Date: Sep. 7, 2001

(87) PCT Pub. No.: WO00/53486

PCT Pub. Date: Sep. 14, 2000

(30) Foreign Application Priority Data

Mar. 9, 1999 (GB) .............................. 9905426

(51) Int. Cl.[7] ................................. B63B 1/24
(52) U.S. Cl. ......................................... 114/274
(58) Field of Search .................. 114/271, 274, 114/284, 285, 286, 287

(56) References Cited

U.S. PATENT DOCUMENTS

| 2,144,111 A | * | 1/1939 | Higgins ...................... 114/285 |
| 2,807,228 A | * | 9/1957 | Vandre ........................ 114/385 |
| 3,327,671 A | * | 6/1967 | Comins ....................... 114/285 |
| 3,435,795 A | * | 4/1969 | Eckfield ...................... 114/285 |
| 3,584,590 A | | 6/1971 | Rings et al. ................ 114/66.5 |
| 3,602,178 A | * | 8/1971 | White ......................... 114/285 |
| 4,909,175 A | * | 3/1990 | Arnseson .................... 114/285 |
| 6,038,995 A | * | 3/2000 | Karafiath et al. ........... 114/271 |

FOREIGN PATENT DOCUMENTS

| GB | 2 069 953 | 9/1981 |
| WO | WO 96/20105 | 7/1996 |
| WO | WO 96/20106 | 7/1996 |
| WO | WO 99/44885 | 9/1999 |
| WO | WO 99/55577 | 11/1999 |

* cited by examiner

Primary Examiner—Stephen Avila
(74) Attorney, Agent, or Firm—Dykema Gossett PLLC

(57) ABSTRACT

The invention relates to hulls for planing or semi-planing water craft. The hull (4) has an abruptly down-swept trailing edge portion (18) which, in the preferred embodiment, is in the form of a flap extending across the full width of the transom of the hull and which projects beyond the level of an upswept portion of the underside (14) of the hull by only a small fraction of the length (L) of the hull. According to another aspect of the invention, a hull (4) having a lightly cambered nose portion (5, 10, 12) is also described and claimed. The claimed hulls offer higher lift coefficients and lift/drag ratios than conventional planing hulls, and can operate at zero angle of attack at design speed.

18 Claims, 8 Drawing Sheets

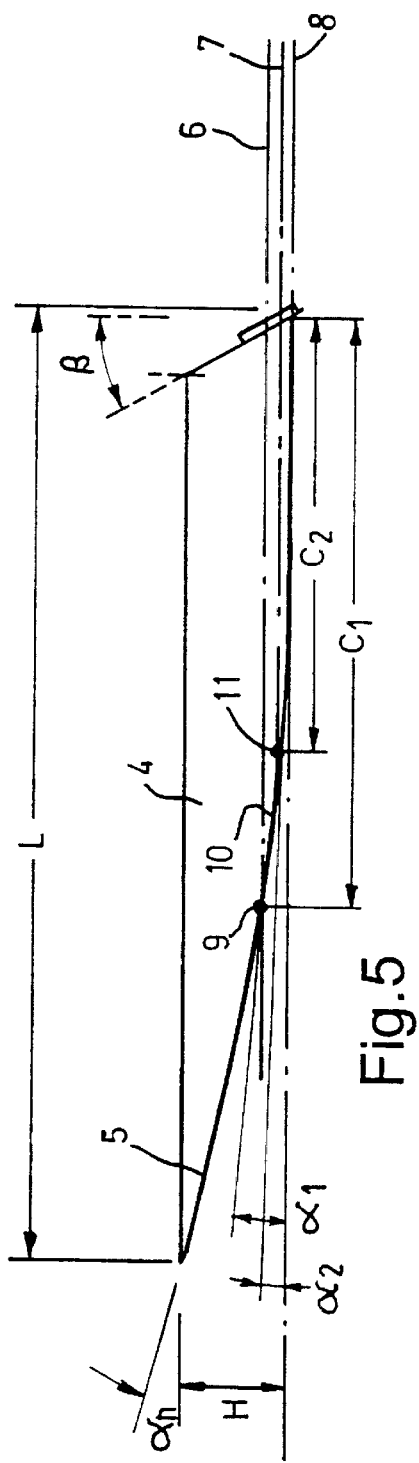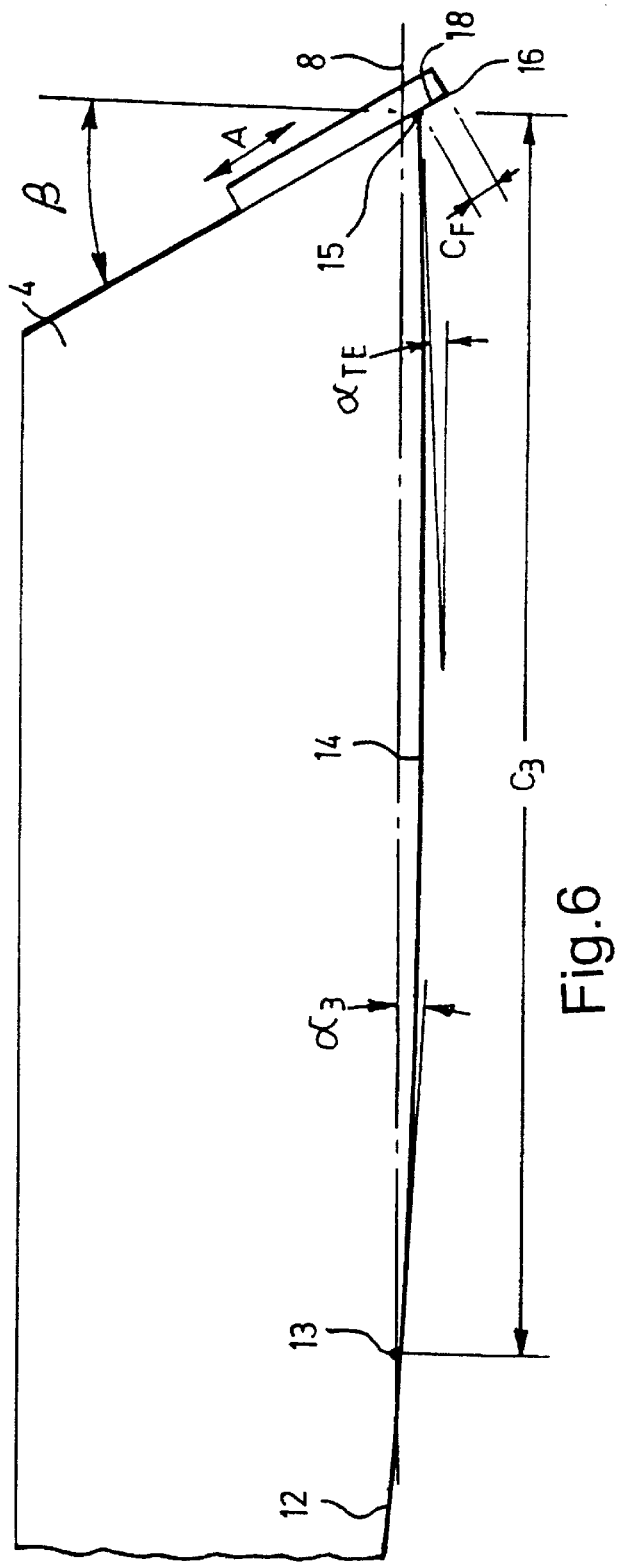
Fig.5
Fig.6

HULLS FOR PLANING AND SEMI-PLANING CRAFT

CROSS REFERENCE TO RELATED APPLICATION

The present application is the U.S. national stage application of International Application PCT/GB00/00864, filed Mar. 9, 2000, which international application was published on Sep. 14, 2000 as International Publication WO 00/53486 in the English language. The International Application claims priority of British Patent Application 9905426.4, filed Mar. 9, 1999.

The present invention relates to hulls for water craft and, more specifically, to longitudinal hull sections and the design thereof. Longitudinal hull sections for planing craft of existing art offer relatively low lift coefficients as well as modest lift/drag ratios. The present invention describes alternative longitudinal sections having higher lift coefficients whilst also giving significantly higher lift/drag ratios.

It will be appreciated that the term "longitudinal section" as used above and hereinbelow in relation to a hull is well understood in the art and refers to the section of the hull aligned to the longitudinal axis of the hull and containing the profile of the underside of the hull.

The pressure distribution along a typical longitudinal hull section of known art is shown in FIG. 1. The pressure coefficient PC attains unity at the leading edge stagnation point 1, falling away rapidly and asymptotically approaching zero at the trailing edge 2. The centre of lift is at a point approximately 30% along the chord (i.e. the wetted length) of the hull. In practice, the pressure coefficient Pc for typical longitudinal sections of hulls of the known art falls away more rapidly than shown. (This phenomenon also moves the centre of lift forwards.) This is due to the low aspect ratio and Vee entry shape of planing hulls of known prior art craft.

Water craft are also known which incorporate one or more flaps or "trim tabs" at the trailing edge of the longitudinal hull section. Such flaps are generally inclined at a relatively small angle to the horizontal, as shown in U.S. Pat. Nos. 5,806,455, 5,215,029 and EP-A-0 071 763, for example. The pressure distribution for a typical longitudinal hull section embodying such a trailing edge flap is shown in FIG. 2. In this case a second pressure peak is established forward of the trailing edge at 3. This has the effect of increasing the pressure along almost the whole section, substantially increasing lift and moving the centre of lift rearwards to approximately 48% of the hull chord. However, flaps of this type normally have an appreciable chord (i.e. the length of the wetted portion of the flap) and as the pressure acts normally to the surface of the flap (apart from a small friction element acting along the surface of the flap), the increase in lift is gained at the expense of a considerable increase in drag if the flap angle (i.e. the angle of the flap relative to the horizontal) is appreciable. Additionally, most trailing edge flaps of this type do not extend over the entire width of the hull and this results in very high tip losses and uneven pressure distribution over the hull. Thus the use of such flaps is a palliative dearly bought to correct the attitude and performance of craft which would otherwise be badly balanced.

One further problem frequently experienced with planing hulls of known art is longitudinal instability at high speed one reason for which is the effect of the bow being apparently 'sucked' into an approaching wave. This latter effect causes considerable drag as the bow can only lift once sufficient displacement lift has been generated or when the wave has passed. Thus FIG. 3 shows a planing hull section of known art in which the forward section is rounded due to immersion in excess of the design value. The corresponding pressure distribution (Coefficient of Pressure, Pc vs. Chord) along the section is shown in FIG. 4. After attaining a value of unity at the stagnation point 1, the pressure coefficient Pc rapidly drops, becoming negative at 10% of the chord and only becoming positive again 35% along the chord. The situation worsens with increased curvature such that the pitching moment can become negative resulting in negative dynamic lift as the stem rises. Due to the negative lift over the curved section the lift/drag ratio of the section shown is only about ⅕th of the value for the same section at its design altitude shown in FIG. 1.

BRIEF DESCRIPTION OF THE INVENTION

It is an aim of th present invention to avoid or minimise one or more of the foregoing disadvantages.

WO 96/20106 discloses a hull for planing or semi-planing watercraft, the hull having a lower surface and an abruptly down-swept trailing portion.

According to the present invention, such a hull is characterised in that a blending surface is provided between the lower surface and the trailing portion.

The trailing edge portion may be integrally formed in the hull. Preferably, though, the trailing edge portion is provided in the form of a flap means projecting generally downwardly from the hull. The flap means is preferably angled at less than 45 degrees to the normal to the design water plane, and may be substantially normal to the design water plane. The flap means preferably extends across the full width of the transom of the hull. The angle of the flap means is preferably fixed but may alternatively be formed and arranged to be variable.

The flap means preferably projects beyond the level of a portion of the underside of the hull immediately adjacent to the flap means, by a length or "chord" which is a small fraction of the length of the hull, typically by less than 1% of the full length of the hull. The chord of the flap means may advantageously be varied by sliding the flap means upwardly or downwardly along an inclined axis on which the flap means may be slidably mounted. Mechanical, electrical and/or hydraulic means may be provided for controlling this movement of the flap means.

The hull may have a nose portion comprising a forward surface extending rearwardly and downwardly from a nose of the hull towards the trailing edge portion, which forward surface is lightly cambered such that, in longitudinal section the hull, the angle of said forward surface relative to the water plane, in use of the hull, is progressively reduced along the length of said nose portion. The lightly cambered nose portion preferably blends smoothly into a rear portion of the underside of the hull which is normally immersed when the craft is moving at its designed operating speed. This rear portion of the underside of the trailing edge portion is preferably also cambered such that the angle of incidence of said underside relative to the design water plane, at the point where the underside meets the forward surface of the nose portion (at the design water plane), in longitudinal section of the hull, is very small, preferably less than two degrees, and may be one degree or less.

The cambered surface of the normally immersed underside may blend smoothly into a generally upswept trailing portion of the underside. This upswept trailing portion of the underside may be inclined to the design water plane, in use of the hull, at a positive or negative angle, depending on the type of craft in which the hull is incorporated, and the design speed and load conditions of the hull.

It will be appreciated that the term "water plane" as used herein refers to the planar intersection of the undisturbed water surface with the hull. The static water plane is the position of the water plane relative to the hull when the hull is at rest The planing water plane is the portion of the water plane relative to the hull at liftoff. The "design water plane" is the position of the water plane relative to the hull at design conditions (i.e. when the hull is operating at its design speed).

It will further be appreciated that "lift-off" refers to the point in time at which the craft incorporating the hull reaches its minimum planing speed.

The upswept trailing portion of the immersed underside of the hull is preferably immediately forward of the abruptly down-swept trailing edge portion of the hull.

In longitudinal section of the hull, the length or "chord" of the immersed section of the length of the hull, in use of the hull under design conditions, is preferably less than one tenth the total length of the hull.

As already described, conventional planing sections require that the craft presents a positive angle of attack in order to generate lift. An advantage of the hulls according to the invention is that they can operate at zero angle of attack at design speed and can be arranged to exhibit little or no attitude change throughout the speed range of the craft.

In addition, the hulls of the invention offer improved lift coefficients and two-dimensional lift/drag ratio. The increased lift coefficient results in a reduced surface area in contact with the water, which, for hulls of equal beam translates into a reduction in the mean chord of the lifting surface and, consequently, an increase in Froude number ($V_s/\sqrt{(g \times L)}$), where Vs is the boat velocity through water, L is the local chord, and g is accelaration due to gravity. This reduces both spray drag and wave making drag. Thus hulls according to the present invention offer considerable power savings compared to conventional hulls of identical weight and size, whilst both wash and spray are also considerably reduced. The reduced spray generation of hulls of this invention renders the fitting of spray rails and other devices designed to increase lift by deflecting the spray sheet downwards unnecessary.

A further benefit offered by the increased lift coefficient is that the craft is able to plane at substantially reduced speeds whilst the higher lift/drag ratio further reduces the power required to achieve planing speed. For propeller driven craft, the increased velocity under the hull due to propulsor slip generates a considerable increase in lift. This effect is much more marked than on conventional hulls due to the much reduced chord and the increased pressure distribution over the rear sections. Also, because of the higher lift coefficient and correspondingly lower planing speeds the propulsor slip is greater. This increases the local velocity relative to the craft so that the dynamic pressure is also increased. The additional lift generated may reduce the power required to achieve planing speed by 30% or more.

BRIEF DESCRIPTION OF THE DRAWING

Preferred embodiments of the invention will now be described by way of example only and with reference to the accompanying drawings in which:

FIG. 5 is longitudinal section of a hull according to one embodiment of the invention;

FIG. 6 is an enlarged view of an aft portion of the hull section of FIG. 5;

DETAILED DESCRIPTION OF THE INVENTION

Figure 1:
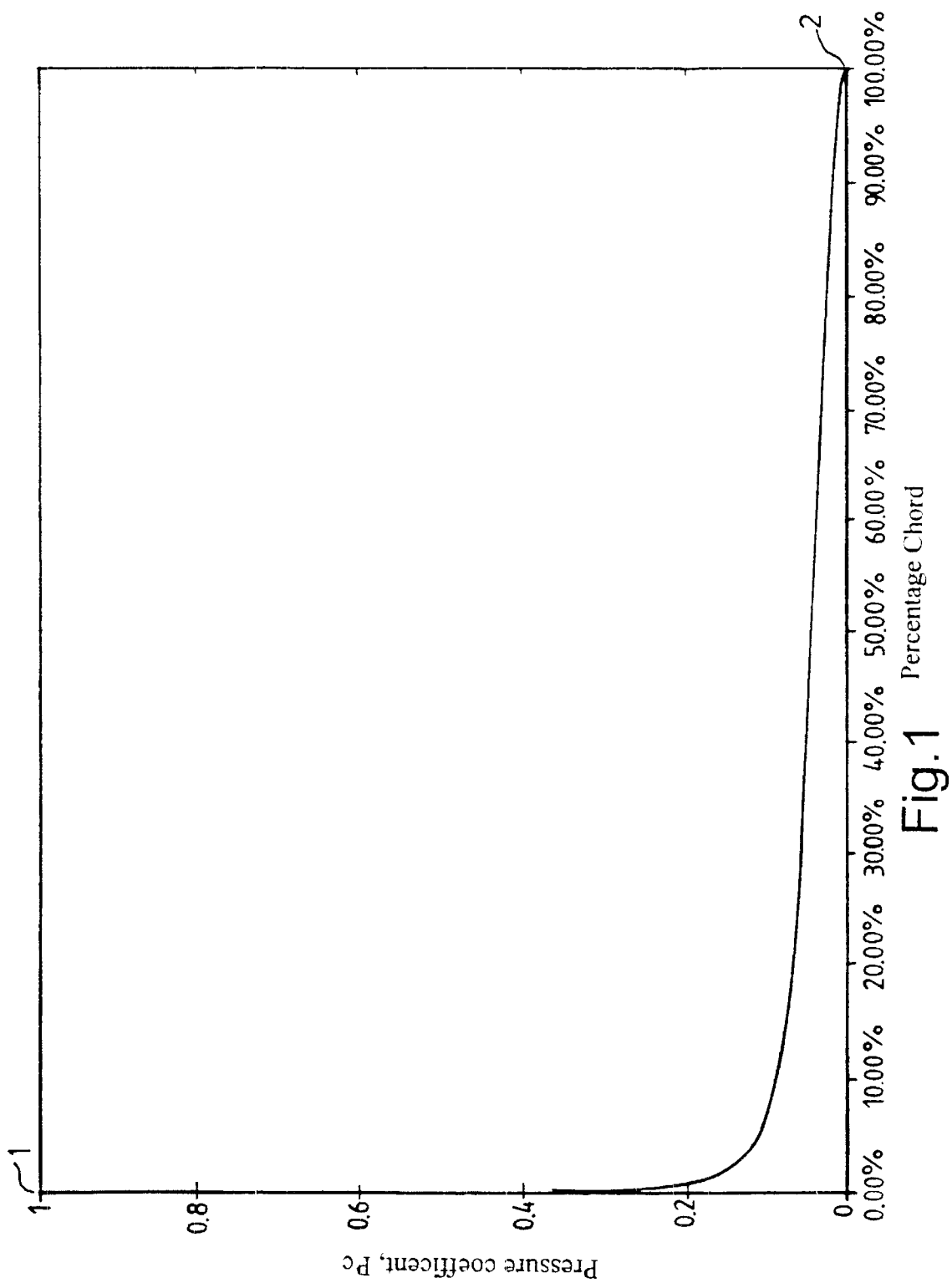
FIG. 1 is a graph of pressure coefficient Pc vs. %chord for a typical prior art longitudinal hull section.

A typical longitudinal hull section 4 according to the present invention is shown in FIG. 5. It should be noted that this is not to scale the vertical axis in FIG. 5 has in fact been magnified for clarity. The longitudinal hull section 4 has a forward surface 5 extending downwardly from the nose of the longitudinal section, towards the trailing edge of the longitudinal section. This surface is generally lightly cambered such as to have a small angle of incidence $\alpha_1$ at the point 9 at which it intersects the static water-plane 6. A further generally lightly cambered surface 10, which is tangent continuous with surface 5 at point 9 intersects the water-plane 7 at which the hull reaches its sustained planing speed at point 11. The tangent angle $\alpha_2$ of surface 10 relative to the planing water-plane 7 is preferentially as small as possible, consistent with the other constraints.

An enlarged view of the aft part of the longitudinal hull section 4 is shown in FIG. 6. A generally lightly cambered surface 12 which is tangent-continuous with surface 10 at point 11 meets the design water-plane at point 13. The angle of incidence $\alpha_3$ at point 13 is preferentially arranged to be very small and may be 1 degree or less. At the design speed the craft rides on surface 14 which is tangent-continuous to surface 12 at point 13. This surface is preferentially lightly cambered and preferentially terminated in an upswept trailing edge at point 15. The tangent angle $\alpha_{TE}$ of the upswept portion of the surface 14 to the design water-plane 8 may range from being slightly negative (down-swept) to being 10 degrees or more positive (up-swept), depending on the type of craft and the design speed and load conditions. Normally, the value of $\alpha_{TE}$ will be in the range of −1 degree to +1 degree.

At the upswept trailing edge 15, the hull is terminated by a sharply down-swept flap 18 which finishes abruptly at 16. The chord $C_F$ of flap 18 (i.e. the wetted length of flap the flap, this being the length of flap projecting beyond the upswept trailing edge 15) is a small percentage of the length L of the hull section 4. For most high-speed craft this percentage will be less than 1%, but may be higher in the special case of planing or semi-planing heavier craft herein described below. Flap 18 is preferentially variable such that by adjusting the position of the flap positively or negatively in the direction of arrow A the chord $C_F$ is varied. A small blend is applied at point 15 between surface 14 and the flap 18. The angle β of the flap relative to the normal to the design water-plane 8 may be positive or negative and will be preferentially less than 45°.

The length, or chord, of the immersed section of the longitudinal section (i.e. the wetted length) whilst static is shown as $C_1$. The chord at the speed at which the craft starts to plane (i.e. at lift-off) is shown as $C_2$. The ratio of chord $C_2$ to the craft length L is much reduced compared to hulls of known art due to the increased lift coefficient, the effect of which is to reduce friction, spray, and wave drag. For high-speed craft the design chord $C_3$ (i.e. the chord at design speed) will be very low and normally less than 10% of the craft length L. The significance of a low value of $C_3$ is to raise the Froude Number as herein above described.

Figure 3:
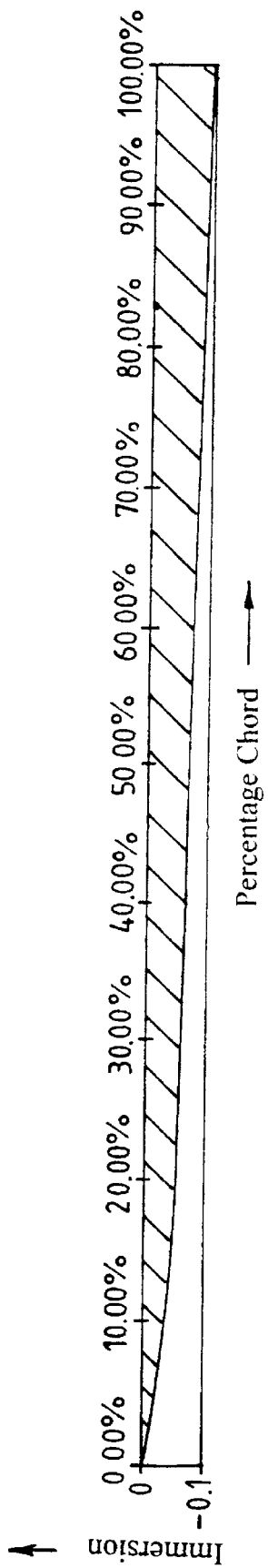
FIG. 3 is a graph of hull immersion vs. %chord for a prior art planing longitudinal hull section at off-design attitude.
Figure 4:
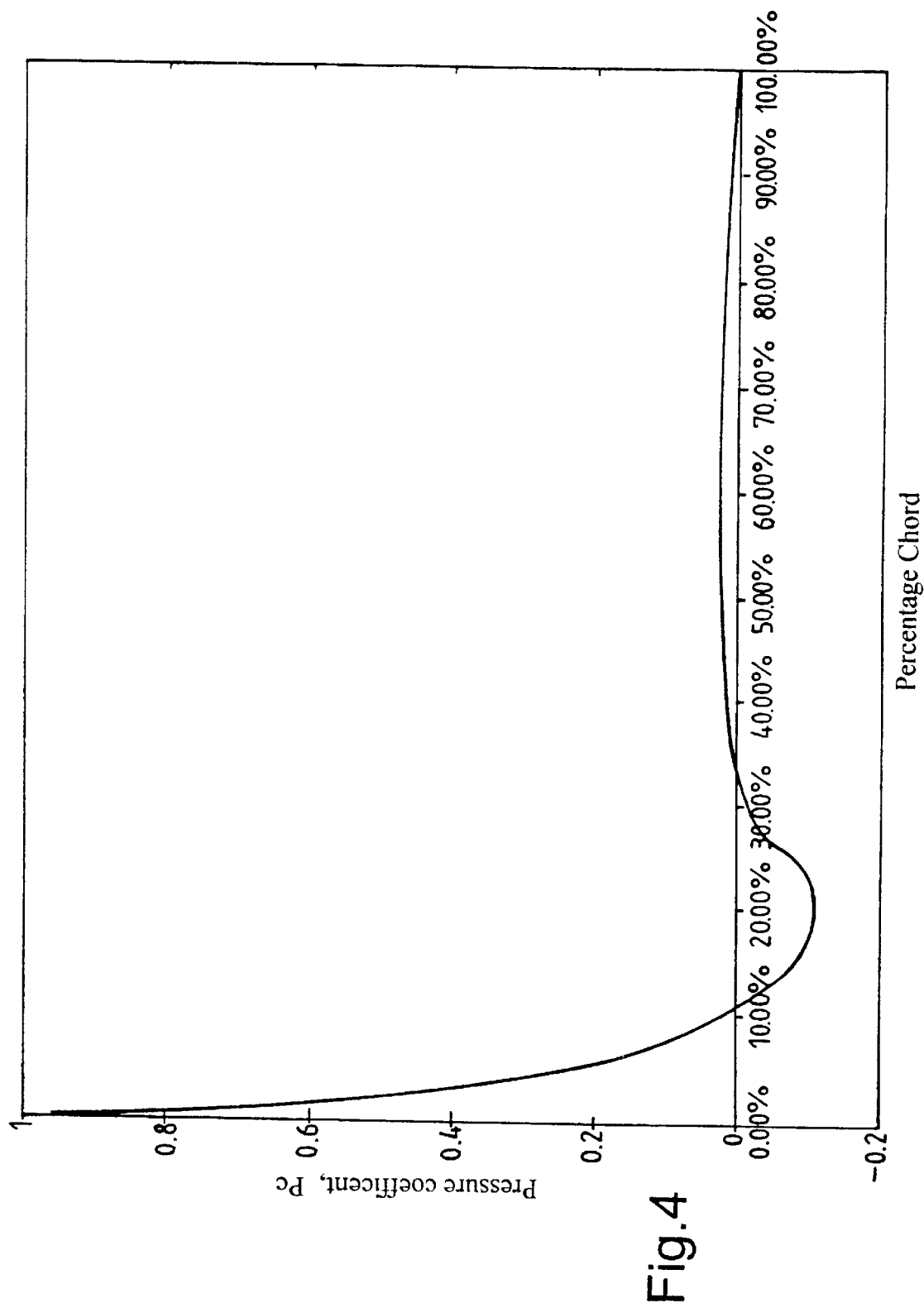
FIG. 4 is a graph of pressure coefficient Pc vs. %chord for the same hull as FIG. 3.
Figure 7:
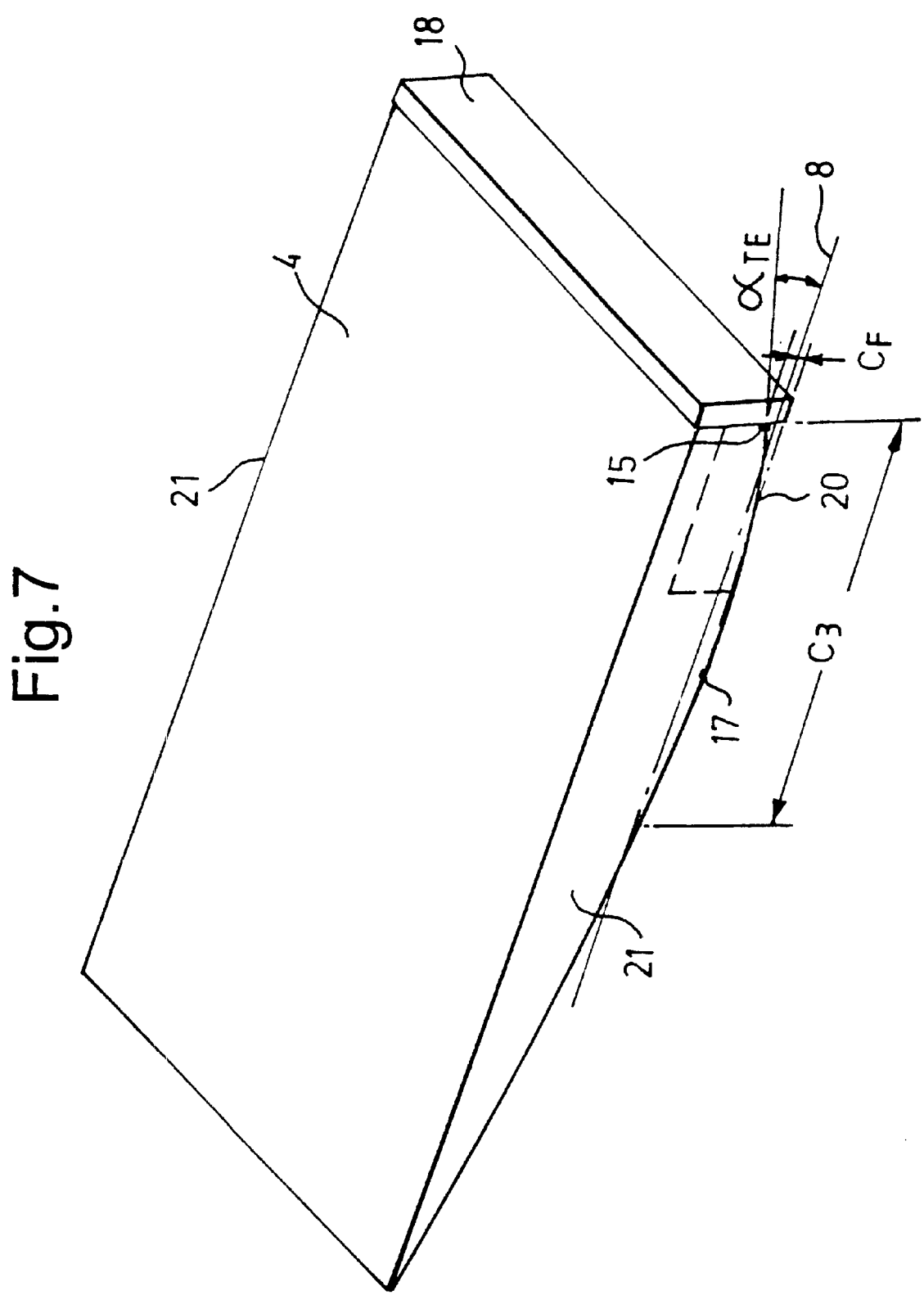
FIG. 7 is a rear perspective view of a hull according to another embodiment of the invention.

A variant suited to heavier planing or semi-planing craft is shown in FIG. 7 which shows a longitudinal hull section 4 in which $\alpha_{TE}$ is a much larger positive angle than shown in FIGS. 3 and 4, such that point 15 is above the design water-plane 8. In this case the flap chord $C_F$ will also be greater. Skirts 20 may beneficially be applied to the sides 21 of the hull section 4 to reduce pressure-loss. Sections of this type can be designed with a lift coefficient in excess of 0.4 and a lift/drag ration in excess of 40.

With reference to FIGS. 3, 4 and 5, the water-planes 6, 7, 8 are shown as straight lines for convenience and refer to undisturbed water-planes at some distance from the craft.

The term 'lightly cambered' used hereinbefore is intended to imply that being cambered along substantially the entire section, the curvature at any point is minimised such that the pressure coefficient Pc does not become negative under any normal condition. The low value of the ratio of the design chord $C_3$ over the length L means that by adopting a low value of curvature expressed as $\delta\alpha/\delta C$, where $\alpha$ is the value of the tangent angle to the water plane at any point along any the surfaces 5, 10, 12, 14 and C is the corresponding chord, by reference to FIG. 1, adequately high values of the prow height H and prow angle $\alpha_n$ are achieved.

It will be appreciated that the terms "pressure coefficient", "lift coefficient", and "drag coefficient" are commonly used and well understood terms in the art having standard definitions in universal engineering as follows:

The pressure generated at the hull surface acts normal to the local hull surface. The pressure coefficient Pc is equal to the pressure acting on a surface of unit area, divided by the dynamic pressure where: dynamic pressure=[water density×($Va^2$/2)], where Va is the local water velocity relative to the craft;

The lift coefficient is the vertical lift generated by a surface, divided by (the planar area of the surface projected onto the water plane×the dynamic pressure) and is equal to the integral of [(pressure coefficient× cosine of the local angle of the hull to the horizontal)– (friction coefficient ×sine of the local angle of the hull to the horizontal)], over the surface area; and The drag coefficient is the horizontal drag generated by a surface, divided by (the area of the surface×the dynamic head) and is equal to the integral of [(pressure coefficient×sine of the local angle of the hull to the horizontal)–(friction coefficient×cosine of the local angle of the hull to the horizontal)], over the surface area, where the local angle of the hull to the horizontal is positive if the tangent of the hull surface is pointing downwards in the aft direction, and where the friction coefficient is the drag force due to surface friction created by a surface of unit area divided by the dynamic pressure.

The lift/drag ratio is defined as the ratio of: lift coefficient/drag coefficient.

Figure 8:
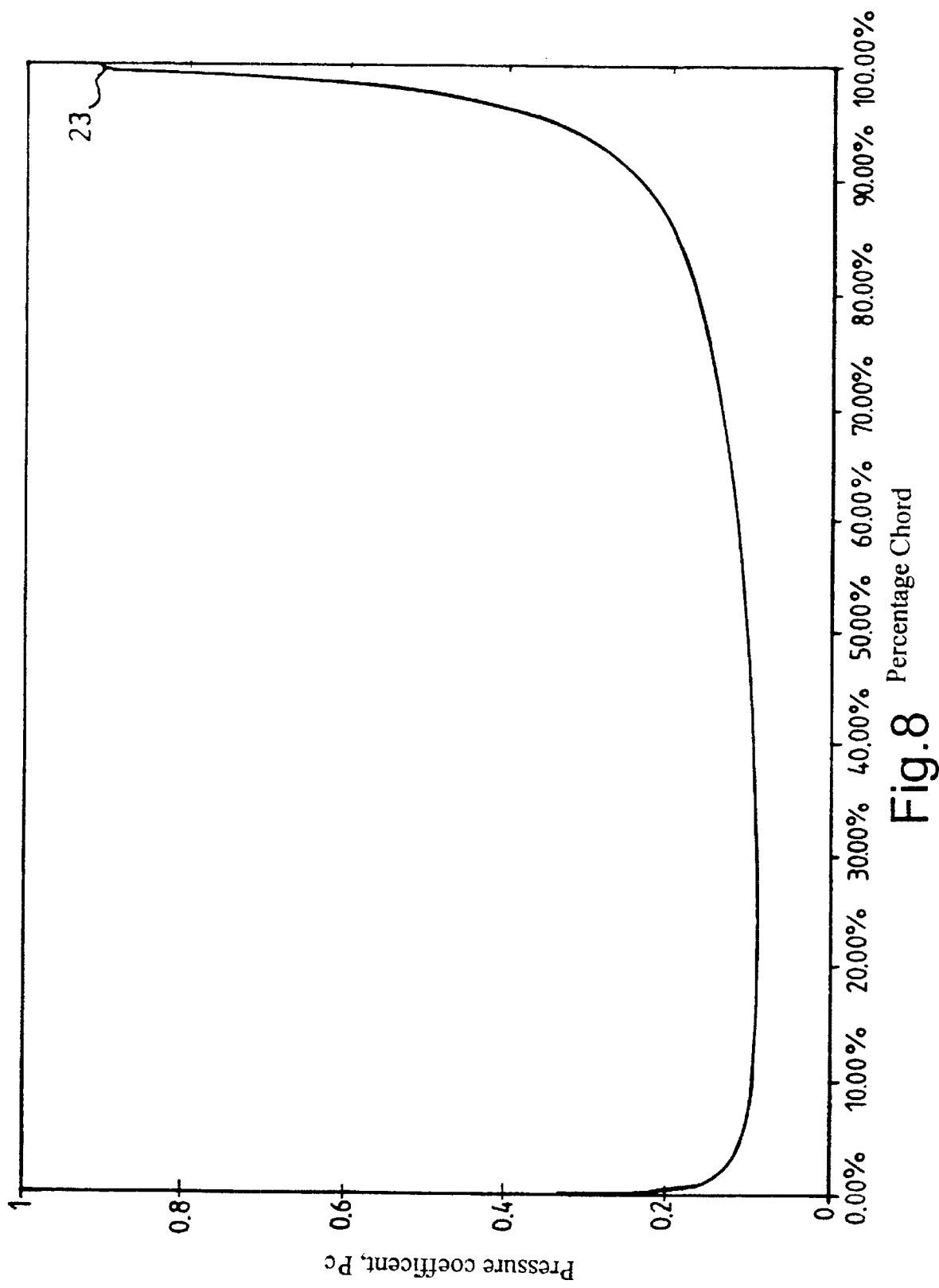
FIG. 8 is a graph of pressure coefficient Pc vs. %chord for a longitudinal section of a hull according to the invention which has been optimised for cruising conditions.
Figure 9:
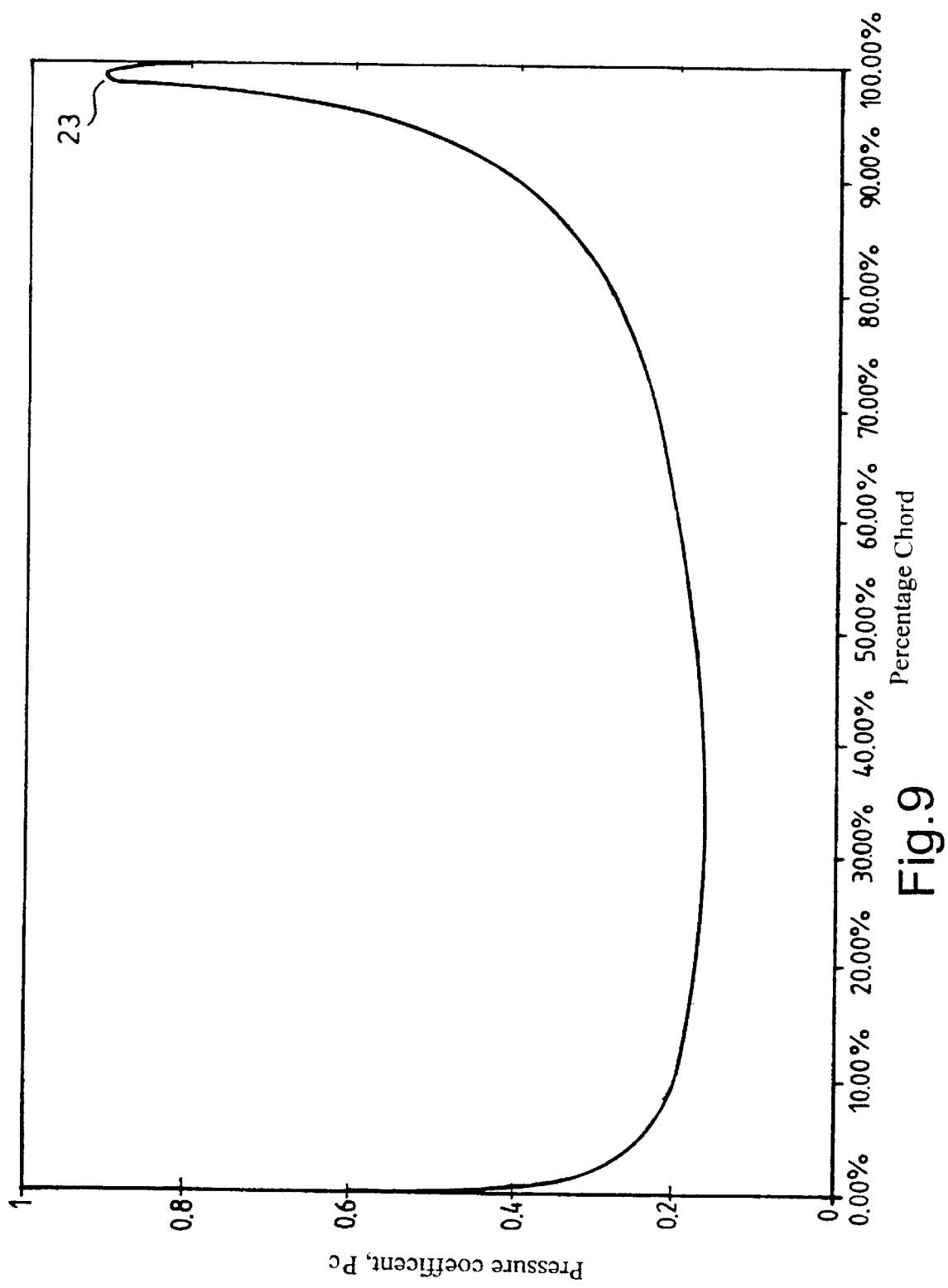
FIG. 9 is a graph of pressure coefficient Pc vs. %chord for a longitudinal section of a hull according to the invention which has been optimised for lift-off conditions.

The working of the hull having the improved longitudinal section above-described will become apparent by reference to the pressure coefficient distribution shown in FIG. 8 and FIG. 9 in which FIG. 8 shows results for a longitudinal hull section according to this present invention which has been optimised for cruising conditions, giving a lift coefficient of 0.15 and a lift/drag ratio of 25:1. The flap chord $C_F$ for this case is 0.5% of the design chord $C_3$. As for sections of known art the pressure coefficient attains a value of unity at the forward stagnation point 1. The surface at this point 13 being at reduced inclination compared to a section of known art shown in FIG. 1, the vertically acting constituent (or lift) is marginally increased whilst the rearwards acting constituent (drag) is reduced. Immediately aft of the stagnation point 1 the pressure coefficient Pc drops away marginally more rapidly than for the section of known art due to the upward inflexion of the surface 14 such that the lift generated by this section is marginally reduced. However, the reducing negative slope of this section further reduces the drag constituent. Progressing along the chord, the pressure coefficient Pc starts to increase due to the increasing influence of the downwardly extending trailing edge flap 18 whilst the pressure coefficient for the section of known art continues to fall away. At the same time the hull surface flattens out and preferentially starts to rise such that the pressure acting on the surface not only generates considerable lift relative to the known art section, but also generates a force constituent which actually pushes the craft along. At the inflexion point 23 the pressure coefficient again approaches unity (the precise value depending on the abruptness of the deflection) It will be evident that this surface creates considerable drag in that the quasi totality of the (high) pressure generated forms a drag constituent due to the vertically downwards extension of the surface. This drag force has to be balanced against the increased lift generated and the forward force component generated by the rear part of surface 14. It will be evident by comparing the areas under she curve of FIG. 8 with that of FIG. 1 that the area under the curve, corresponding to the lift generated, has been increased approximately three-fold. The lift/drag ratio has approximately doubled.

Figure 2:
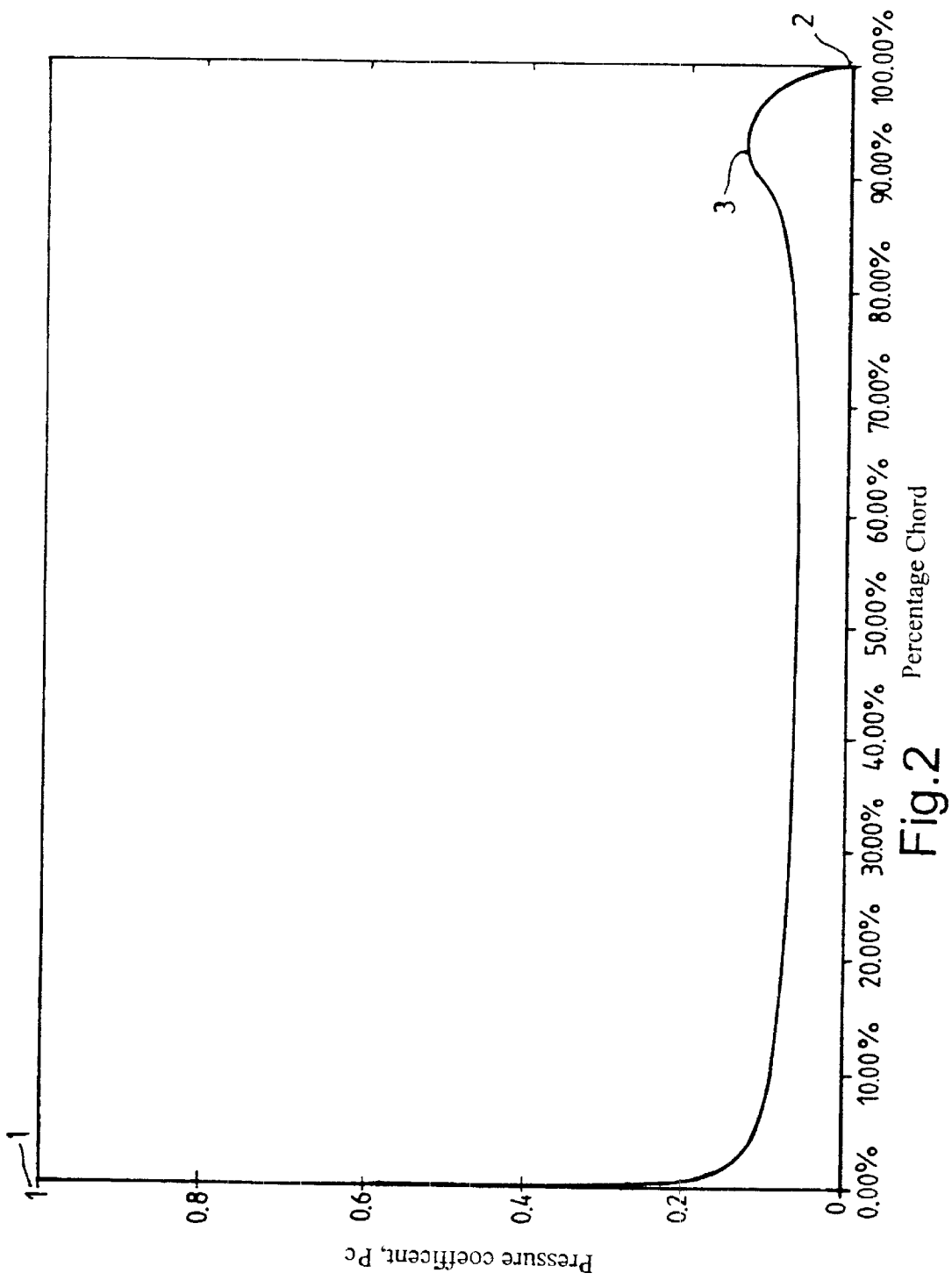
FIG. 2 is a graph of pressure coefficient Pc vs. %chord for a typical prior art longitudinal hull section where a trailing edge flap is attached to the hull.

FIG. 9 shows results for a longitudinal hull section according to this present invention which has been optimised for lift-off conditions, giving a lift coefficient of 0.25 and a lift/drag ratio of 15:1. The flap chord $C_F$ for this case is increased to 2.0% of the planing chord $C_2$. The increased flap chord as a percentage of the section chord broadens the peak 23 in the pressure coefficient near the trailing edge of the hull and generally raises the value of the pressure coefficient over the whole chord of the hull. It will be evident by comparing the areas under the curve of FIG. 9 with that of FIG. 2 that the area under the curve, corresponding to the lift generated, has been increased approximately three-fold. The lift/drag ratio has remained sensibly the same. Whilst in the case of the flapped prior art section the centre of lift moved rearwards by approximately 16% of the chord with the application of the flaps, the centre of pressure of the new section moves forwards by 7% of the chord. This reduced shift is of considerable benefit in maintaining the trim of the craft.

The lift coefficients and lift/drag ratios herein above quoted refer to two-dimensional section data (for the longitudinal section of the hulls). The three-fold increase in section lift coefficient means that the design chord $C_3$ will be reduced by the same factor for a hull of the same weight and beam. The Froude number will be increased by √(3). The decreased tip losses resulting from the increased width/chord ratio of the planing surface together with the reduction in the spray and wave-making losses due to the increased Froude number have a knock-on effect such that in practice the new improved sections show an increase in lift coefficient and an increase in the lift/drag ratio by a factor of approximately five when applied to a 3-dimensional hull form. The effect of the forward-facing spray sheet wherein the small angle of incidence $\alpha_3$ coupled with the high width/chord ratio of the lifting surface means that the majority of the spray sheet at the bow is projected forward rather than deflected sideways as is the case for hulls of known art. This effect causes the hull to 'ride-over' the generated spray sheet which entrains air bubbles, further reducing skin friction.

It will be evident that to gain the maximum advantage, hulls using the new hull sections should optimally be equipped with a variable flap. At sub planning speeds the flap should ideally be retracted to minimise drag, whilst to lift the craft onto the plane the flap should be extended to provide high lift. At cruising speed the flap should be partially retracted to provide minimum drag and at speeds above the design point the flaps should be further retracted to maintain the immersed chord close to its design value.

It will be evident to those experienced in the art of high velocity flow with free surface effects that the precise lift and drag characteristics may be precisely computed and optimised and that minor changes may be made to the section shapes to optimise flow around actual three-dimensional hulls, without departing from the scope of the invention as defined in the appended claims.

What is claimed is:

1. A hull (4) for planing or semi-planing water craft, the hull having a lower surface (14) and an abruptly down-swept trailing edge portion (18); characterzed in that a blending surface (15) is provided between the lower surface (14) and the trailing edge portion (18), wherein said trailing edge portion is provided in the form of a flap means (18) projecting downwardly from the hull (4) and where the angle (3) of the flap means (18) is fixed.

2. A hull according to claim 1, wherein said trailing edge portion (18) is integrally formed in the hull.

3. A hull according to claim 1, wherein said flap means (18) is angled at less than 45 degrees to the normal to the design water plan (8).

4. A hull according to claim 1, wherein said flap means is substantially normal to the design water plane.

5. A hull according to claim 1, wherein the flap means (18) extends across the full width of a transom of the hull.

6. A hull according to claim 1, wherein the flap means (18) projects beyond the level of a portion (15) of the underside of the hull immediately adjacent to the flap means, by a chord ($C_F$) which is less than 1% of the full length (L) of the hull (4).

7. A hull according to claim 6, wherein the chord ($C_F$) of the flap means (18) can be varied by sliding the flap means upwardly or downwardly along an inclined axis on which the flap means is slidably mounted.

8. A hull according to claim 7, wherein at least one of mechanical, electrical and hydraulic means is provided for controlling this movement of the flap means (18).

9. A hull according to claim 1, wherein the hull (4) further includes a nose portion comprising a forward surface (5,10,12) extending rearwardly and downwardly from a nose of the hull towards said trailing edge portion (18), which forward surface is lightly cambered such that, in longitudinal section of the hull, the angle ($\alpha$) of said forward surface relative to the water plane, in use of the hull, is progressively reduced along the length of said nose portion.

10. A hull according to claim 9, wherein the lightly cambered nose portion (5,10,12) blends smoothly into a rear portion (14) of the underside of the hull which is normally immersed when the hull (4) is moving at its designed operating speed.

11. A hull according to claim 10, wherein this rear portion (14) of the underside of the trailing edge portion is also cambered such that the angle of incidence ($\alpha_3$) of said underside relative to the design water plan (8), at the point (13) where the underside meets the forward surface (10) of the nose portion at the design water plane, in longitudinal section of the hull, is less than two degrees.

12. A hull according to claim 11, wherein said angle of incidence ($\alpha_3$) of said underside relative to the design water plane is less than or equal to one degree.

13. A hull according to claim 9, wherein the cambered surface (14) of the normally immersed underside blends smoothly into a generally upswept trailing portion of the underside.

14. A hull according to claim 13, wherein said upswept trailing portion of the underside is inclined to the design water plane (8), in use of the hull, at an angle of ($\alpha_{TE}$) which is dependent on the type of craft in which the hull (4) is incorporated, and the design speed and load conditions of the hull.

15. A hull according to claim 13, wherein said upswept trailing portion of the underside is inclined to the design water plane (8), in use of the hull, at an angle ($\alpha_{TE}$) which is in the range of −1 degree to +1 degree.

16. A hull according to claim 13, wherein said upswept trailing portion is immediately forward to the abruptly down-swept trailing edge portion (18) of the hull.

17. A hull according to claim 1, wherein, in longitudinal section of the hull, the length of the immersed section (chord $C_1$) of the length (L) of the hull, in use of the hull under design conditions, is less than one tenth of the total length (L) of the hull.

18. A water craft incorporating a hull (4) according to claim 1.

* * * * *